US012479761B2

(12) United States Patent
Boote et al.

(10) Patent No.: US 12,479,761 B2
(45) Date of Patent: Nov. 25, 2025

(54) GLAZING HAVING A CONDUCTIVE COATING AND A PRINTED LAYER, A METHOD FOR PRODUCING THE SAME AND USE OF THE SAME (71) Applicant: Pilkington Group Limited, Nr. Ormskirk Lancashire (GB)

(72) Inventors: Joseph Jeremy Boote, Lancashire (GB); Graham Siddons, Ellesmere Port (GB)

(73) Assignee: Pilkington Group Limited, Nr. Ormskirk Lancashire (GB)

( * ) Notice: Subject to any disclaimer, the term of this patent is extended or adjusted under 35 U.S.C. 154(b) by 884 days.

(21) Appl. No.: 17/772,033

(22) PCT Filed: Nov. 2, 2020

(86) PCT No.: PCT/GB2020/052767
§ 371 (c)(1),
(2) Date: Apr. 26, 2022

(87) PCT Pub. No.: WO2021/084279
PCT Pub. Date: May 6, 2021

(65) Prior Publication Data
US 2022/0363591 A1    Nov. 17, 2022

(30) Foreign Application Priority Data
Nov. 1, 2019  (GB) ...................................... 1915907

(51) Int. Cl.
*B32B 15/04*  (2006.01)
*B32B 17/06*  (2006.01)
(Continued)

(52) U.S. Cl.
CPC ................ *C03C 17/04* (2013.01); *C03C 8/12* (2013.01); *H05B 3/86* (2013.01); *B60J 1/001* (2013.01);
(Continued)

(58) Field of Classification Search
CPC .................................................. C03C 2217/70
(Continued)

(56) References Cited

U.S. PATENT DOCUMENTS 2,710,900 A    6/1955   Linder
5,414,240 A *  5/1995   Carter ............... B32B 17/10174
                                                     219/547
(Continued)

FOREIGN PATENT DOCUMENTS

CN    103476584 A    12/2013
CN    108689616 A    10/2018
(Continued)

OTHER PUBLICATIONS

International Search Report (PCT/ISA/210) and Written Opinion (PCT/ISA/237) mailed on Jan. 20, 2021, by the European Patent Office as the International Searching Authority for International Application No. PCT/GB2020/052767.
(Continued)

*Primary Examiner* — Lauren R Colgan
(74) *Attorney, Agent, or Firm* — BUCHANAN INGERSOLL & ROONEY PC (57) ABSTRACT The invention provides a glazing comprising first glass sheet comprising a printed layer on a portion of a surface of the glass sheet and a conductive coating on the surface of the first glass sheet. The conductive coating extends over at least a portion of the printed layer to form a coated print portion and extends over a portion of the surface of the glass sheet to form a coated glass portion. The coated print portion has
(Continued)

a Developed Interfacial Area Ratio Sdr less than 27.45%. A method for producing the glazing and use of the glazing in a vehicle is also disclosed.

22 Claims, 5 Drawing Sheets

(51) Int. Cl.
  *C03C 8/12* (2006.01)
  *C03C 17/04* (2006.01)
  *H05B 3/86* (2006.01)
  *B60J 1/00* (2006.01)

(52) U.S. Cl.
  CPC .. *C03C 2217/212* (2013.01); *C03C 2217/213* (2013.01); *C03C 2217/216* (2013.01); *C03C 2217/23* (2013.01); *C03C 2217/485* (2013.01); *C03C 2217/70* (2013.01)

(58) Field of Classification Search
  USPC .............................. 428/410, 426, 432, 434
  See application file for complete search history.

(56) References Cited

U.S. PATENT DOCUMENTS

| | | | |
|---|---|---|---|
| 6,531,181 B1 | 3/2003 | Niemann et al. | |
| 6,559,419 B1* | 5/2003 | Sol | H05B 3/84 52/171.2 |
| 6,734,396 B2* | 5/2004 | Sol | H05B 3/84 52/171.2 |
| 10,101,149 B1* | 10/2018 | Haack | G01B 5/0025 |
| 2003/0116551 A1* | 6/2003 | Sol | B32B 17/10761 219/203 |
| 2006/0186105 A1 | 8/2006 | Voeltzel et al. | |
| 2013/0092676 A1 | 4/2013 | Offermann et al. | |
| 2013/0244359 A1* | 9/2013 | Bamber | H10F 77/1694 438/71 |
| 2014/0017472 A1 | 1/2014 | Coster et al. | |
| 2017/0135160 A1* | 5/2017 | Masschelein | H05B 3/06 |
| 2018/0299265 A1* | 10/2018 | Haack | G01B 11/30 |
| 2019/0023106 A1 | 1/2019 | Gagliardi et al. | |

FOREIGN PATENT DOCUMENTS

| | | |
|---|---|---|
| EP | 0367209 A2 | 5/1990 |
| GB | 2184929 A | 7/1987 |
| JP | H02-201887 A | 8/1990 |
| JP | 2003176154 A | 6/2003 |
| JP | 2017525643 A | 9/2017 |

OTHER PUBLICATIONS

Search Report for GB 1915907.8 dated May 5, 2020 (2 pages).
Notice of Reasons for Refusal issued on Apr. 2, 2024, by the Japanese Patent Office in corresponding Japanese Patent Application No. 2022-525537 and an English translation of the Office Action. (7 pages).
Notification of the First Office Action issued on Oct. 27, 2023, by the China National Intellectual Property Administration in corresponding Chinese Patent Application No. 2020080075309.0 and an English translation of the Office Action. (18 pages).

* cited by examiner

GLAZING HAVING A CONDUCTIVE COATING AND A PRINTED LAYER, A METHOD FOR PRODUCING THE SAME AND USE OF THE SAME

FIELD OF THE INVENTION

The present invention relates to glazings comprising a conductive coating and a printed layer, a method of producing the same and use of the same, for example as laminated vehicle glazings.

BACKGROUND OF THE INVENTION

Single sheet or laminated glazings are useful as vehicle glazings. Laminated glazings are particularly useful as windshields or rear glazings, comprising two or more sheets of glazing material, usually glass, bonded together using bonding polymers.

Such glazings may have a de-misting and/or a de-icing function provided by electrical heating. Parts of the glazing may also require variable heating, for example, by more rapid heating of a wiper rest area or a portion of the glazing where a camera is situated (as part of an Advanced Driver Assistance System, ADAS).

To produce a vehicle glazing having an electrically conductive region, an electrically conductive coating may be provided on the surface of the glass sheet or on at least one of the plies of the laminate. The conductive coating also advantageously provides solar control properties to the glazing.

Conductive coatings for use in glazing heating applications usually comprise at least one silver layer located between dielectric layers. Such layers may be deposited on the surface of at least one of the plies by vacuum coating processes, for example, sputtering. The coating may be deposited either before or after shaping of the glazing.

Electrically conductive coatings for use in heating applications have busbars typically positioned along edges of the conductive coating which are in electrical contact with the electrically conductive coating and serve to connect the electrically conductive coating to the power supply, usually of a vehicle.

U.S. Pat. No. 2,710,900 A (Linder) discloses a vehicle glazing. Spaced busbars on a glass sheet are covered with a conductive film. Intermediate the busbars are electroconductive aids of higher electrical conductivity than the film to control resistance between the busbars.

US20060186105A1 (Voeltzel) discloses a laminated vehicle glazing. A busbar assembly is on an inner surface of an outboard glass ply. A conductive coating is deposited over the busbar assembly and a portion of the glass. A decorative band is on an inner surface of an inboard glass ply. The decorative band forms an opaque border around a periphery of the glazing to conceal portions of the busbar assembly.

US20170135160A1 (Masschelein) discloses a laminated vehicle window glazing with a conductive coating, masking strip and copper foil busbars. A conductive coating deposited on a masking strip formed conventionally by screen printing has sheet resistance 4 ohms/square. A coating deposited on a masking strip formed by an inkjet method of spraying droplets has sheet resistance 2 ohms/square.

In summary it is usual to provide a vehicle glazing with a dark coloured obscuration band (i.e. decorative band or masking strip) towards the edges of the glazing in the form of printed layers to hide the busbar from view. The obscuration band may be formed from an enamel ink which is printed on the surface of a glass ply and pre-fired at between 400 and 680° C. and then bent to shape. Firing may occur at the same time as shaping of the glass ply and, as discussed above, the conductive coating may then be deposited on the surface of the glass ply and on the surface of the printed layer. In laminated glazings, the electrically conductive coating, busbars and obscuration band may be deposited on surface 2, which is the inner surface of the laminate in contact with the polymer interlayer and the outer glass ply.

Variations in the conductivity of conductive coatings can be problematic and may lead to hotspots and inefficient use of electrical power. It would be advantageous to design electrically conductive coatings to ensure efficient heat distribution over the heated glazing and to enable, if desired, parts of the glazing to be heated more rapidly or to a different temperature (e.g. a heated wiper rest area, HWRA). There is a need therefore to provide improved glazings with predetermined heat distribution. It is an aim of the present invention to address that need.

SUMMARY OF THE INVENTION

The present invention accordingly provides, in a first aspect, a glazing comprising:
a first glass sheet comprising a printed layer on a portion of a surface of the glass sheet,
a conductive coating on the surface of the first glass sheet, the conductive coating extending over at least a portion of the printed layer to form a coated print portion and extending over a portion of the surface of the glass sheet to form a coated glass portion,
wherein the coated print portion has a Developed Interfacial Area Ratio Sdr less than 27.45%.

The inventors have discovered that by controlling an area measurement of roughness of a coated print, a desired sheet resistance can be obtained, and optimal process conditions found.

This is greatly advantageous because selecting a predetermined area measurement of roughness of the coated print portion provides the ability to modify heating distribution in a glazing easily.

The coated print portion can be combined with busbars and external circuits to provide further advantageous embodiments. The invention teaches how to select optimal conditions for a production process for selection of an ink, a firing time and a firing temperature.

Configuring the coated print portion having the selected area measurement of roughness with busbars the coated print portion becomes a heater of predetermined power for a desired zone of the glass sheet.

The inventors have overcome a technical prejudice of the prior art (e.g. US20170135160A1) that sheet resistance of a coated print portion is controlled by the linear measurement of roughness Ra of a printed layer. The inventors have discovered that area measurements of roughness, Sa, Sdq or Sdr, of the coated print portion have better correlation with sheet resistance, believed to be due to better measurement of fine structure of the surface.

Preferably at least two printed busbars are provided for supplying electrical power to the conductive coating, each busbar being in electrical contact with the conductive coating, It is greatly advantageous to print the busbars because this ensures an improved contact between busbars and coated print portion.

Preferably, the sheet resistance of the coated print portion is in the range 2 to 200 ohms/square, more preferably in the range 2.5 to 120 ohms/square, most preferably in the range 3 to 8 ohms/square.

The coated print portion may have an Area Roughness Sa in the range 0.15 µm to 0.30 µm. Preferably, the coated print portion has a Developed Interfacial Area Ratio Sdr in the range 5 to 25%. The surface of the printed layer (3) preferably has a root mean square gradient Sdq in the range 4° to 30°, preferably in the range 5° to 25°.

The coated print portion may have an Average Roughness Ra greater than 0.5 µm, preferably greater than 0.6 µm, more preferably greater than 0.7 µm, more preferably greater than 0.8 µm and most preferably greater than 0.9 µm.

The inventors have measured Average Roughness Ra using a profilometer having a stylus tip radius of 2 to 10 µm and have found poor correlation with sheet resistance. The inventors have measured Developed Interfacial Area Ratio Sdr using an AFM having a tip radius of 2 to 20 nm and have found good correlation with sheet resistance. It is believed that sheet resistance of a conductive coating on a printed layer is controlled by fine structure of the coating surface, which can be measured by an AFM but not by a profilometer.

The inventors have discovered that, usually, the sheet resistance of the coated glass portion is less than the sheet resistance of the coated print portion. The sheet resistance of the coated glass portion may be in the range 0.5 to 4.5 ohms/square, more preferably in the range 1.0 to 4.0 ohms/square. The sheet resistance of the coated print portion may be at least 20% greater than or less than the sheet resistance of the coated glass portion, preferably at least 50% greater than the sheet resistance of the coated glass portion, more preferably at least 100% greater than the sheet resistance of the coated glass portion.

In order to mask the busbars and edges of the glazing (when in use), the printed layer will usually be an obscuration band, preferably located toward the periphery of the glazing. Preferably, the printed layer acts to obscure the peripheral area of the glazing and thus preferably the printed layer has a visible light transmission (ISO 9050 Vis) of 0.1% or lower, more preferably 0.05% or lower.

The printed layer may be formed of an enamel ink comprising inorganic pigment and frit. Usually, the enamel ink comprises pigment, typically black, having particles with an average particle size greater than 5.2 µm. Usually, the enamel will comprise 10 wt % to 50 wt % inorganic pigment, and 20 wt % to 80 wt % frit. The oxide frit may include particles of at least one compound selected from silica, titania, alumina, zirconia, compounds having fluoride ion (e.g., fluorite, fluorapatite, cryolite, etc.), bismuth oxide, zinc oxide, boron oxide, potassium oxide, sodium oxide, calcium oxide, barium oxide, lead oxide, lithium oxide, phosphorous oxide, molybdenum oxide, strontium oxide, and magnesium oxide. A suitable inorganic pigment may comprise a pigment selected from a Fe/Cr pigment, a Co/Al pigment, a Co/Al/Cr pigment a Co/Ti pigment, a Co/Cr pigment, a Ni/Fe/Cr pigment, a Ti/Cr/Sb pigment, a Fe pigment, a Cr pigment and/or a mixture of two or more of these pigments.

Examples of Enamel Inks

Infra-red drying glass enamel ink 1L5350-WF803# is a suspension of frits and inorganic pigments in an organic medium of solvent and resin. Solvent is 2-(2-butoxyethoxy)ethanol. Resin is a polyamine amide salt. Solids content is 86.5%. Available from Johnson Matthey Advanced Glass Technologies B.V., Fregatweg 38, 6222 NZ Maastricht, The Netherlands.

Infra-red drying glass enamel ink 1EPB2020-WF733P is a suspension of frits and inorganic pigments in an organic medium of solvent and resin. Solvent is 2-(2-butoxyethoxy)ethanol. Resin is 1,2-Ethanediamine polymer with aziridine. Solids content is 84.6%. Available from Johnson Matthey Advanced Glass Technologies B.V., Fregatweg 38, 6222 NZ Maastricht, The Netherlands.

Other suitable ink types from Johnson Matthey include RD 1379, RD 100, IT 3015.

Ceramic coating ink 1401936 (14 316 IR-9876-C) is a suspension of frits and inorganic pigment in organic solvents glycol ether/-acetate and alcohol. Available from Ferro GmbH, Gutleutstraße 215, 60327 Frankfurt am Main, Germany.

Glass enamel ink YD-WA607 is a suspension of frits and inorganic pigments in an organic medium of solvent and resin. Frits are $Bi_2O_3$—$B_2O_3$—$SiO_2$, 35-60%. Inorganic pigments are $Cr_2O_3$, CuO, $MnO_2$, $Co_2O_3$, ZnO, 20-35%. Solvent is terpineol, 15-20%. Resin is cellulose resin 1-10%. Available from Shenzhen Octopus Technology Co., Ltd, No. 9 Octopus Building, Yuanling Industrial Park, Tianxin Blvd, Baoan District, Shenzhen, China.

Cobalt, preferably as an oxide, provides anti-stick function as well as being a pigment. Anti-stick function is particularly useful for an Advanced Press Bend™ forming process. Particle size may also be selected for anti-stick function.

Advantageously, the conductive coating is a solar control coating comprising a plurality of coating layers, preferably a sputtered solar control coating (i.e. formed by sputtering, usually magnetron sputtering).

The conductive coating may comprise at least one infrared reflective layer, preferably comprising silver. The conductive coating may comprise two or three infrared reflecting layers (usually of silver) if higher conductivity or improved solar control are desired.

The conductive coating will usually comprise a plurality of dielectric layers, each infrared reflective layer being located between at least two dielectric layers. Each dielectric layer may comprise a material selected from tin oxide, zinc oxide, zinc stannate, aluminium nitride, silicon nitride or a mixture of two or more of these materials.

In order to provide more durable coatings, the conductive coating may comprise at least one protective layer, optionally comprising titanium, niobium or a mixture of titanium and niobium.

The printed busbars may be in contact with the coated print portion or further comprising an additional busbar for heating the coated glass.

An advantage of the present invention is that the use of the coated print portion with predetermined sheet resistance enables great design freedom to control heating of parts of the glazing. Thus, preferably the printed busbars and the coated print portion are configured so the coated print portion heats a desired zone of the glass sheet. Thus, the glazing may comprise a wiper rest area or a camera area, and the coated print portion may be located and adapted to heat the wiper rest area or a camera area.

The coated print portion and the coated glass may be configured as components of a series circuit or a parallel circuit.

The nature of the printed layer may be modified to affect the predetermined sheet resistance of the coated print portion. Thus, the printed layer may be formed so that the printed layer has a portion that is patterned, optionally comprising dots, lines, a fade-out, or a feathered edge, or other patterns.

Additionally, or alternatively, the printed layer may further comprise an overprint layer comprising a conductive print, optionally a silver-containing conductive print, to adjust the sheet resistance of the coated print portion either before or after the conductive coating is applied. The overprint may also be formed so that the overprint has a portion that is patterned, optionally comprising dots, lines a fade out or a feathered edge, or other patterns. Preferably the overprint comprises dots of silver print. In an embodiment, a conductive coating on a printed layer had sheet resistance 15 ohms/square. On an identical printed layer, a pattern of silver dots was applied by printing and then an identical coating was applied by sputtering and the resulting product had sheet resistance 3 ohms/square.

In glazings it may be useful if the glass sheet is a toughened glass sheet.

The glazing may be a laminated glazing in which case the glazing may further comprise a ply of interlayer material positioned on the glass sheet and a second glass sheet positioned on the ply of interlayer material to form a laminated glazing. The ply of interlayer material may comprise polyvinyl butyral (PVB).

The invention may provide a vehicle window comprising a glazing according to the first aspect.

The present invention provides, in a second aspect, a method for producing a glazing, the method comprising:
providing a first glass sheet,
providing an ink and printing a printed layer on a portion of a surface of the glass sheet,
firing the ink of the printed layer for a firing time in the range 80 to 180 seconds and at a temperature in the range 500° C. to 695° C.,
depositing a conductive coating on the surface of the first glass sheet, the conductive coating extending over at least a portion of the printed layer to form a coated print portion and extending over a portion of the surface of the glass sheet to form a coated glass portion,
wherein the ink, the firing time and the firing temperature are selected so that the coated print portion has a Developed Interfacial Area Ratio Sdr less than 27.45%.

Preferred embodiments of the second aspect of the invention are generally as discussed in relation to the first aspect with appropriate modification.

Preferably the firing of the ink of the printed layer is at a firing temperature in the range 500 to 680° C., more preferably 620 to 670° C., most preferably 620 to 640° C. or 640 to 660° C.

Preferably the method comprises a step of printing at least two busbars for supplying electrical power to the conductive coating, the two busbars each being in electrical contact with the conductive coating. Printing the busbars is either before or after depositing the conductive coating.

The inventors believe that fine structure of a surface is indicated during a production process by a porosity test. In the porosity test, water is applied and water absorption by the surface is assessed visually. From the porosity test, and gloss measurements, the inventors have found that porosity depends on firing temperature more than on firing time.

At low temperature, particles of printed ink are not correctly fused together, so porosity is high. At high temperature, the printed ink layer cracks and forms fissures, so porosity is high. At an intermediate temperature, the printed ink cures optimally, so porosity is low. The inventors have found that low porosity is associated with fine structure of the surface which is smooth and so has low sheet resistance.

Glazings according to the invention find use in many applications including as vehicle glazings. Thus, in a third aspect the present invention provides use of a glazing according to the first aspect may be in a vehicle, in a building, in an electronic display or in white goods (e.g. refrigerators or freezers).

BRIEF DESCRIPTION OF THE DRAWINGS

The present invention will now be described by way of example only, and with reference to, the accompanying drawings, in which like reference numbers identify like parts throughout.

DETAILED DESCRIPTION

Figure 1:
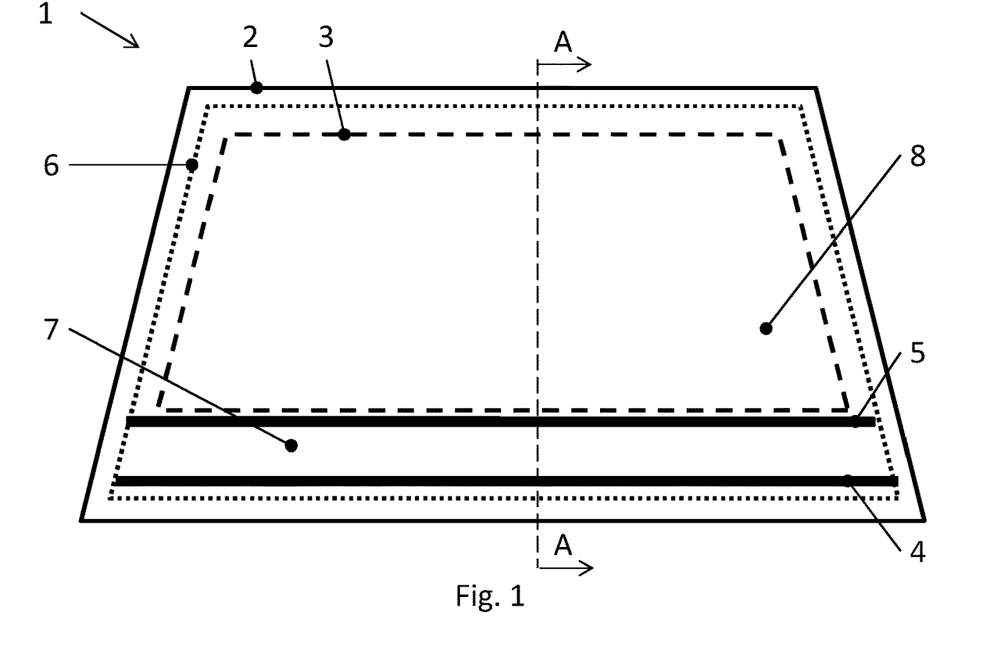
FIG. 1 is a plan view of a glazing or window according to the invention having one heater.
Figure 2:
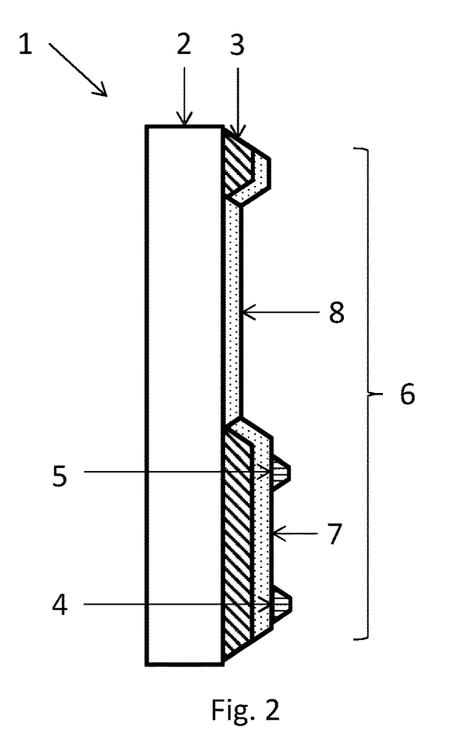
FIG. 2 is a cross-section of the glazing of FIG. 1 on the line A-A.
Figure 3:
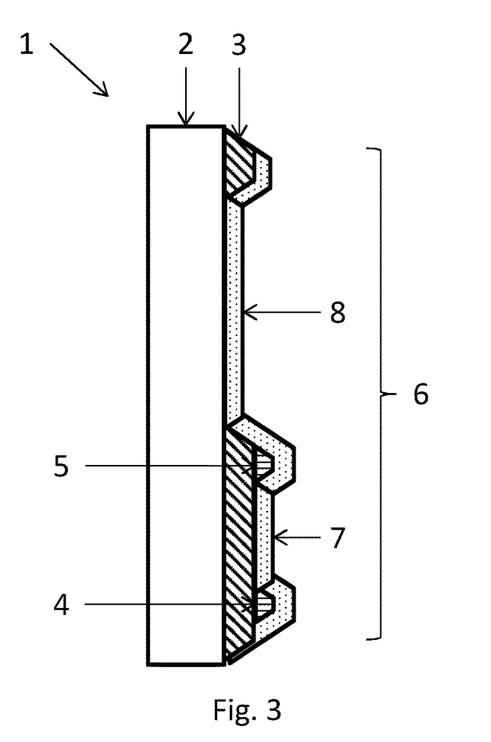
FIG. 3 is an alternative cross-section of the glazing of FIG. 1, busbars on the print.

Referring to FIG. 1, a glazing (1) comprises a glass sheet (2). The glass sheet (2) may be soda-lime-silica glass formed by the float process, and have thickness from 0.5 mm to 25 mm. The glass sheet (2) may be toughened or semi-toughened and monolithic. Optionally a ply of interlayer material may be applied to the glass sheet (2) and a second glass sheet applied to the ply of interlayer material to form a laminated glass.

A printed layer (3) is printed on the glass sheet (2). The printed layer may be enamel, as disclosed in US20170135160A1 and may be applied by any known method, for example screen printing or inkjet printing.

A conductive coating (6) is deposited on at least a portion of the printed layer (3) forming a coated print portion (7). The conductive coating (6) may have a plurality of functional layers for electrical conductivity, infrared-reflection (IRR), low-emissivity, transmission and reflection in the visible spectrum (Tvis, Rvis) and solar control. Functional layers may include a base dielectric of zinc oxide or zinc-tin on zinc oxide, deposited by sputtering (physical vapour deposition).

A laminated glazing may be made generally as follows. A flat glass substrate (e.g. 2.1 mm thick soda lime float glass) is subjected to printing, for example screen printing (e.g. using a screen that may have e.g. 50 to 120 threads/cm polyester screen for example 77 or 100 threads/cm polyester screen) by a silk-screen and doctor blade with an enamel ink to form a screen-printed layer to act as an obscuration band which is optionally dried by subjecting this substrate to infrared radiation from an infrared heater at a temperature below 300° C. Two printed glass substrates to form the outer glass ply 12 and inner glass ply 14 are then stacked and the stacked substrates are subjected to bending. In this stage, a source of heat is provided and bending can be effected for example by heating over 8 minutes to a temperature of 570° C., held at this temperature for a firing time of one minute and then bent at this temperature in a bending mould or frame by press or sag bending, The substrates are separated and then, after cooling, are coated with a sputtered conductive coating and then laminated together using a PVB interlayer (about 0.76 mm thick).

The glazing may be laminated by methods involving, for example, first a nip roller or using a vacuum ring applied to the edges of the first and second plies of glass to de-gas the PVB layer. The first and second glass plies and the PVB layer are laminated together in an autoclave in the pressure range 6 bar to 14 bar and in the temperature range 110 to 150° C.

Conductive coatings may be deposited generally as follows. The coating process is preferably carried out by setting up suitable coating conditions such that any oxygen deficit of any oxide layer of the coating is kept low to achieve a high stability of the light transmittance and colour of the coated glass panes during a heat treatment.

Layers may be deposited on glass sheets using conventional AC and/or DC magnetron sputtering devices, medium-frequency sputtering being applied where appropriate. All dielectric layers of an oxide of Zn and Sn (ZnSnOx, weight ratio Zn:Sn is about 50:50) were reactively sputtered from zinc-tin targets in an $Ar/O_2$ sputter atmosphere. The ZnO growth promoting top layers of the lower anti-reflection layers were sputtered from Zn targets in an $Ar/O_2$ sputter atmosphere. The functional consisting of pure silver (Ag) was sputtered from silver targets in an Ar sputter atmosphere without any added oxygen and at a partial pressure of residual oxygen below 10 mbar. The barrier layers of (slightly substoichiometric, low light absorbing) Al-doped zinc oxide (ZnO:Al) were sputtered from conductive ZnOx:Al targets in a pure Ar sputter atmosphere without added oxygen. In the case of a TiOx barrier layer the deposition process would preferably have been controlled such that the oxygen content of the layer increased from the silver layer outwards. The base layer of the lower anti-reflection layers and the outer antireflection layers of aluminium nitride (AlNx) were each reactively sputtered from an Al target in an $Ar/N_2$ sputter atmosphere containing only residual oxygen. The layers of silicon nitride (SiNx) were reactively sputtered from an Al-doped Si target in an $Ar/N_2$ sputter atmosphere containing only residual oxygen.

The coating stack (double silver) may have the following layers with thickness (in nm as indicated)
Glass/ZnOx 25 nm-38 nm Ag 8-10 nm/TiOx blocker 1 nm-3 nm/ZnOx 77 nm-89 nm/Ag 10 nm-12 nm/TiOx blocker 1 nm-3 nm/ZnOx 31 nm-38 nm/SiO2:Al 4 nm-6 nm An alternative coating stack (also double silver) has improved conductivity, i.e. lower sheet resistance:
Glass/ZnSnOx 22 nm-32 nm/ZnO:Al or ZnO 4 nm-6 nm/Ag 8-10 nm/TiOx blocker 1 nm-3 nm/ZnSnOx 73 nm-83 nm/ZnO:Al or ZnO 4 nm-6 nm/Ag 10 nm-12 nm/TiOx blocker 1 nm-3 nm/ZnSnOx and/or ZnO:Al (or ZnO) 31 nm-38 nm/SiO2:Al 4 nm-6 nm Glazings according to the present invention are advantageous because they enable modification of the sheet resistance of portions of the heatable glazing to provide predetermined heat distribution, wherein parts of the glazing are heated more rapidly or to a different temperature.

Higher sheet resistance regions of coating on the printed layer may increase the total circuit resistance and reduce overall heating power for a given voltage. Selecting positions of busbars, adding an additional busbar and arrangement of switches can overcome this problem, as will be shown in the following examples.

Figure 6:
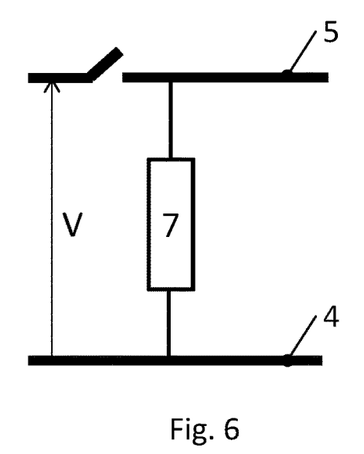
FIG. 6 is a circuit diagram of the window of FIG. 1.

FIG. 6 is a circuit diagram for FIG. 1, showing a coated print portion (7) supplied with a voltage (V) from first and second busbars (4, 5).

Figure 4:
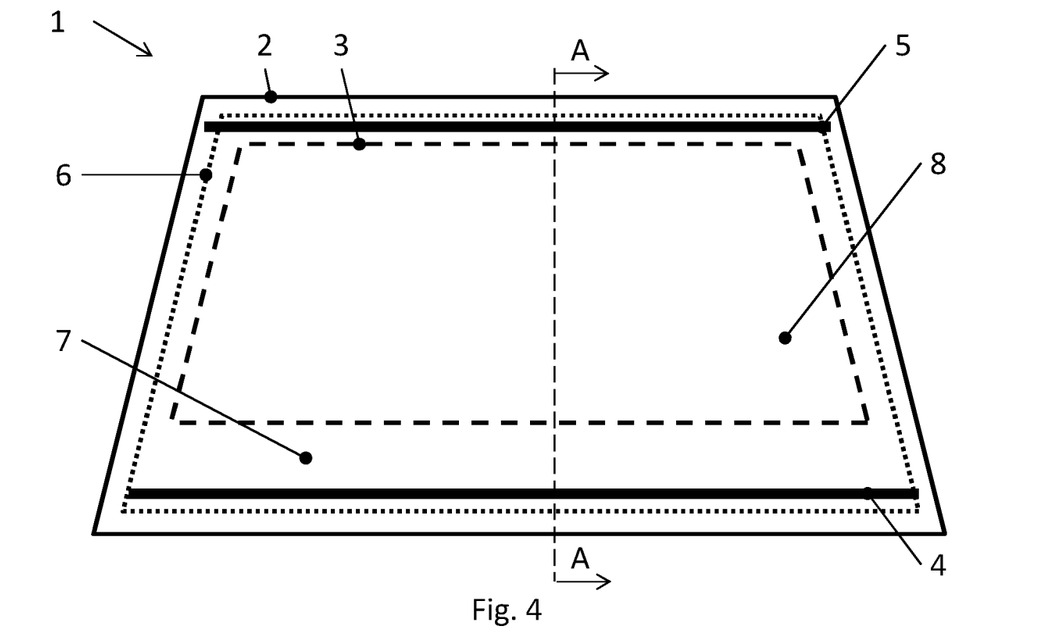
FIG. 4 is a plan view of another glazing according to the invention having two heaters in series.
Figure 7:
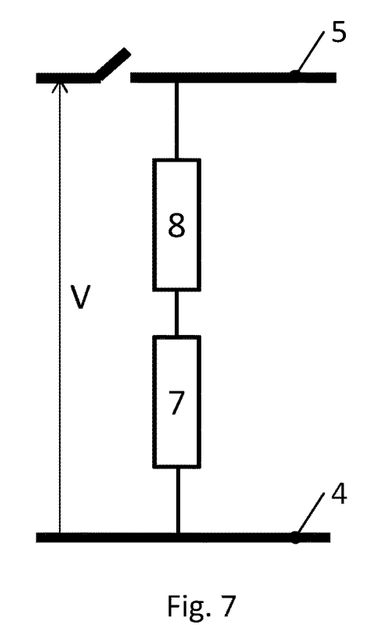
FIG. 7 is a circuit diagram of the window of FIG. 4.

FIG. 7 is a circuit diagram for FIG. 4, showing a coated print portion (7) and a coated glass portion (8) supplied with a voltage (V) from first and second busbars (4, 5) in series so the same current flows through each region. Power density in a coated print portion (7) is higher than in the coated glass portion (8), due to higher sheet resistance, so temperature is higher. This behaviour can be utilised in, for example, a Heated Wiper Rest Area or a portion of the glazing (10) where a camera is situated.

By contrast, power density in parts of the coated print portion (7) at left and right sides of the coated glass portion (8) is lower than in the coated glass portion (8) due to higher sheet resistance, so temperature is lower.

Figure 5:
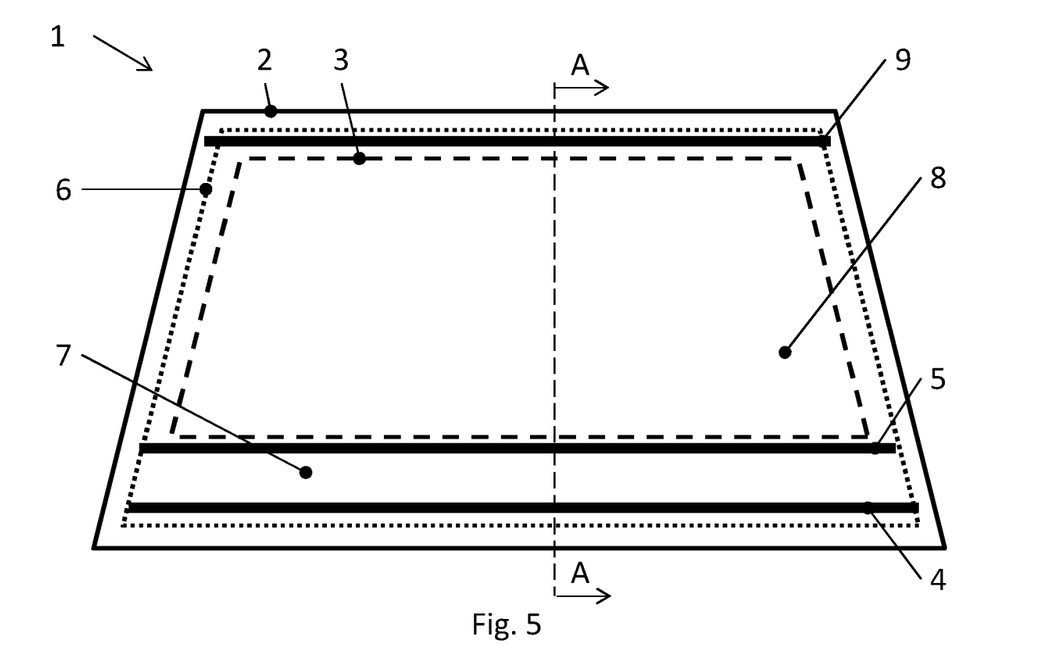
FIG. 5 is a plan view of another window according to the invention having three busbars.
Figure 8:
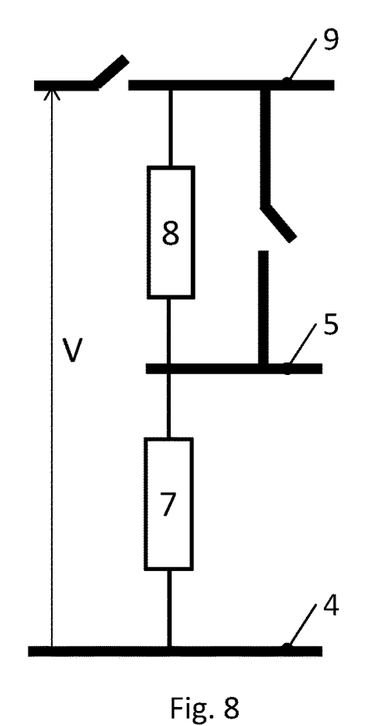
FIG. 8 is a circuit diagram of the window of FIG. 5, wired in series.
Figure 9:
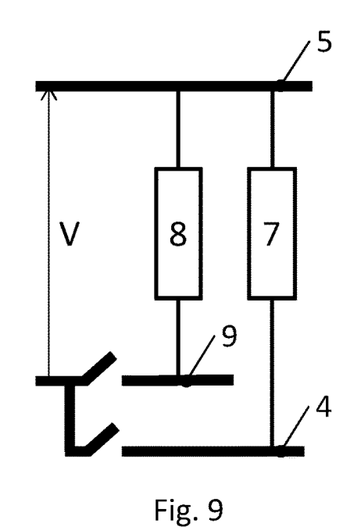
FIG. 9 is a circuit diagram of the window of FIG. 5, wired in parallel.

FIG. 8 and FIG. 9 are circuit diagrams for FIG. 5. A coated print portion (7), where it extends the full width of the conductive coating (6), is supplied from first and second busbars (4, 5). A coated glass portion (8) and remaining parts of the coated printed portion (7) at left and right sides and at the top of the coated glass portion (8) are supplied from the second busbar (5) and an additional busbar (9). The power density and temperatures in the coated print portion (7) is higher than in the coated glass portion (8). This behaviour can be utilised in for example for a Heated Wiper Rest Area or a portion where a camera is situated.

In FIG. 8, the coated print portion (7) and the coated glass portion (8) are connected in series, so the voltage (V) is shared between them, applied via a first switch. Optionally, a second switch is connected across the coated glass portion (8) and is closed for rapid heating of the coated print portion (7), used as a Heated Wiper Rest Area.

In FIG. 9, the coated print portion (7) and the coated glass portion (8) are connected in parallel, so the voltage (V) is applied to each of them independently, via first and second switches.

By changing the shape of the coated print portion (7), heating current may be directed to achieve non-uniform heating of the glazing. For example, a large printed region for sensors, known as a sensor farm, may divert current around the sensor farm, reducing heating power in the sensor farm and advantageously increasing temperatures either side thereof.

Example

Table 1 shows examples of sheet resistance and area measurements of roughness according to the invention.

Samples 620-680 use Johnson Matthey ink type 1EPB2020. Samples F18 to F20 use Ferro ink type 14 316. Samples O1 to O10 use Octopus ink type WA607.

TABLE 1

| Sample | Sheet resistance (ohms/square) | Sa (nm) | Sdr (%) | Sdq (°) |
|---|---|---|---|---|
| 680 | 3.55 | 140.0 | 5.2 | 19.1 |
| 670 | 3.66 | 188.0 | 11.7 | 28.4 |
| 660 | 3.80 | 226.0 | 15.1 | 31.3 |
| 650 | 4.89 | 223.5 | 17.9 | 33.8 |
| 640 | 6.56 | 277.5 | 22.2 | 37.6 |
| 630 | 6.59 | 223.5 | 24.1 | 39.3 |
| 620 | 7.30 | 221.0 | 26.4 | 40.6 |
| F19 | 3.9 | 163.5 | 5.7 | 20.2 |
| F18 | 4.2 | 172.5 | 5.8 | 20.4 |
| F20 | 6.9 | 175.5 | 8.6 | 24.5 |
| O10 | 17.7 | 167.0 | 11.0 | 27.6 |
| O6 | 32.2 | 242.5 | 14.8 | 31.8 |
| O1 | 109.2 | 213.0 | 24.5 | 39.6 |

Figure 10:
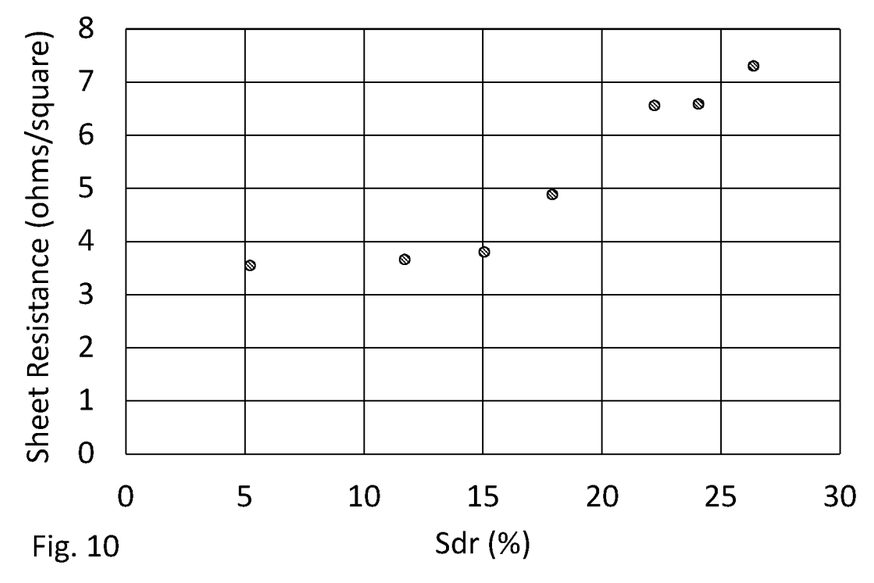
FIG. 10 is a graph of sheet resistance of coated print portions as a function of Developed Interfacial Area Ratio (Sdr) up to 8 ohms/square.
Figure 11:
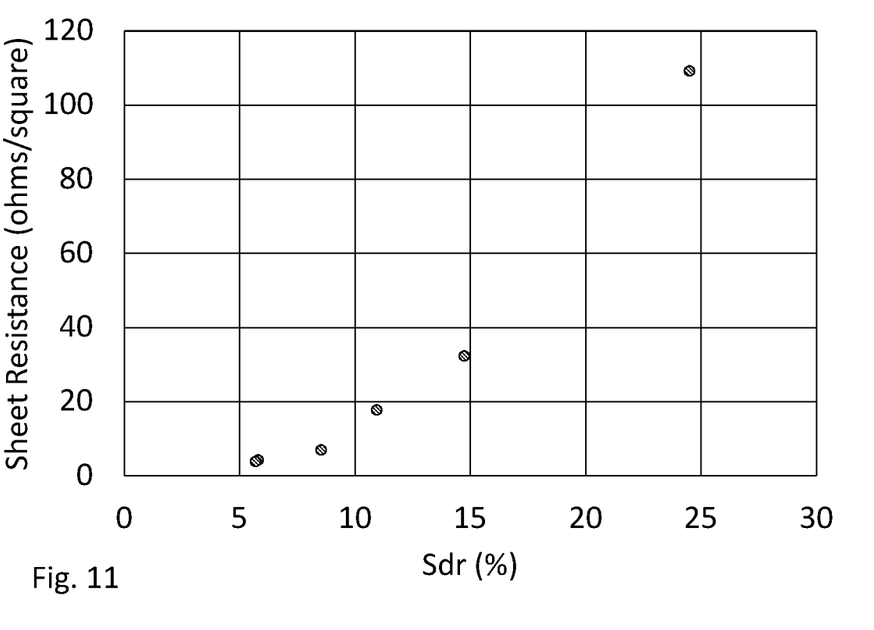
FIG. 11 is a graph of sheet resistance of coated print portions as a function of Developed Interfacial Area Ratio (Sdr) up to 120 ohms/square.

FIG. 10 and FIG. 11 are graphs of sheet resistance as a function of an area measurement of roughness Sdr and show that there is a correlation between area measurements of roughness and sheet resistance. Modifying fine structure of the surface by selecting the appropriate enamel ink and appropriate firing conditions (e.g. firing time and temperature) enables control of the fine structure of the surface of the printed layer and hence sheet resistance of the coated print portion.

Figure 12:
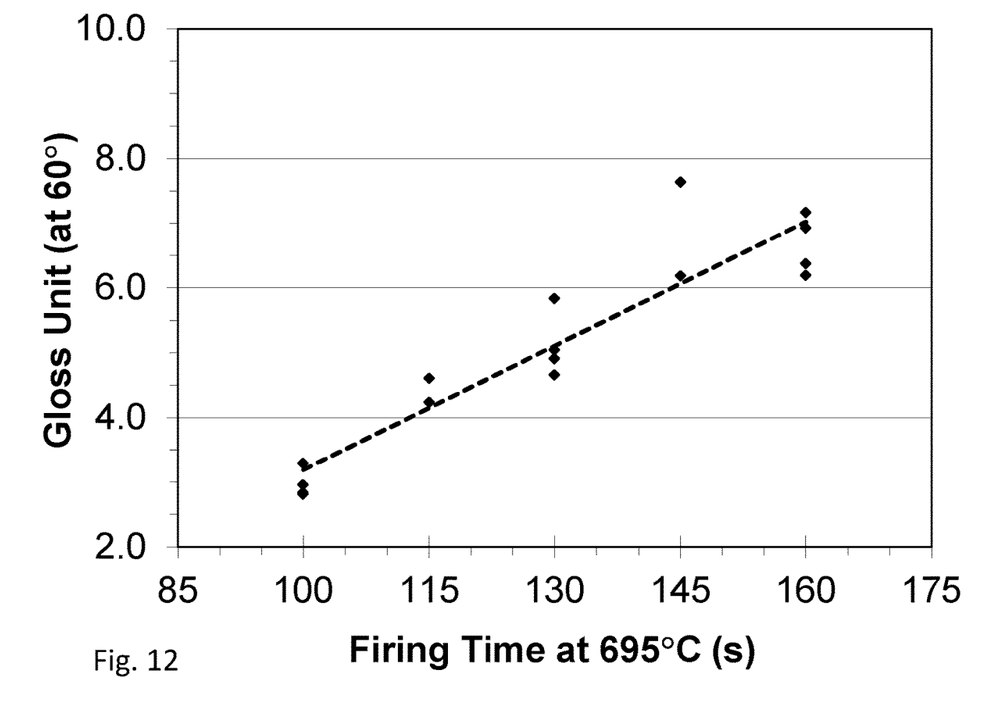
FIG. 12 is a graph of Gloss (at 60° viewing angle) of coated print portions as a function of firing time at 695° C. of the printed layer. Gloss varies with area measurements of roughness of the coating. High gloss generally indicates fine structure of the surface, which is smooth, associated with low porosity and low sheet resistance.

FIG. 12 is a graph of gloss (at 60°) of a coated print portion (7) as a function of firing time (at 695° C.) of the printed layer (3) for a 3.1 mm thick glass sheet (2) with a printed layer screen-printed using Johnson Matthey high durable anti-stick low melting point enamel (1T3015-WF789). Gloss (e.g. according to standard test method for specular gloss, ASTM D523) is the specular reflection of a surface, due partly to the fine structure of a surface. FIG. 12 shows that changing firing time of an enamel enables control of gloss, at least partly due to smooth fine structure of the surface. An optimal firing time is 145 seconds for high gloss of the printed layer (3), associated with low sheet resistance of the coated print portion (7) in the finished product. This quantitative data confirms the qualitative findings of the porosity test.

Figure 13:
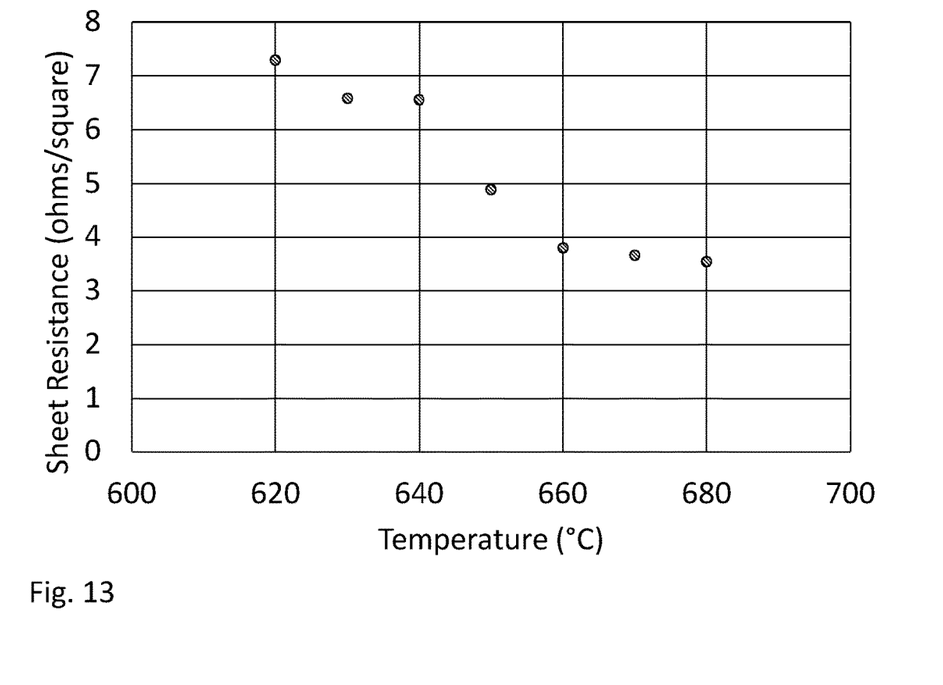
FIG. 13 is a graph of sheet resistance of coated print portions as a function of firing temperature 620 to 680° C.

FIG. 13 shows a graph of sheet resistance of coated print portion (7) as a function of firing temperature 620 to 680° C. of the printed layer (3). Ink type is Johnson Matthey 1EPB2020-WF733P, as disclosed above. Sheet resistance becomes less at higher firing temperatures.

For all samples in Table 1, a conductive coating (6) was deposited on a glass sheet (2) forming a coated glass portion (8) and sheet resistance thereof was 3.0 ohms/square. Sheet resistance was measured using a four-point method, for example Guardian Model SRM 232, available from Bridge Technology, PO Box 9275, Chandler Heights AZ, 85127, USA.

The samples in Table 1 each had an uncoated region of the printed layer (3) and the average roughness Ra thereof was greater than 0.7 μm. Ra was measured using a profilometer having a stylus radius 2 μm. For example, Talysurf™ is available from Taylor Hobson, PO Box 36, 2 New Star Road, Leicester, LE4 9JQ, UK.

Atomic Force Microscope (AFM) measurements were made using an AFM having a tip radius 2-20 nm. For example, an AFM having Tapping™ mode and NanoScope™ software is available from Bruker UK Ltd, Banner Lane, Coventry, CV4 9GH, UK. AFM analysis of the samples was provided over a region of 5 μm×5 μm in one area of each sample Comparative Example Table 2 shows a comparative example of sheet resistance and area measurements of roughness not according to the invention. Sample 610, like samples 620-680, uses Johnson Matthey ink type 1EPB2020.

Sample 610 was made by firing the printed layer (3) to a firing temperature 610° C. The coated print portion (7) has Sdr of 27.45% and sheet resistance of 9.44 ohms/square.

TABLE 2

| Sample | Sheet resistance (ohms/square) | Sa (nm) | Sdr (%) | Sdq (°) |
|---|---|---|---|---|
| 610 | 9.44 | 206.5 | 27.45 | 41.4 |

Technical Effect

Examples 620-680 have surprising correlation between Sdr and sheet resistance as shown in FIG. 10 so can be configured as coated print portions (7) to heat a zone of the glass sheet (2). But comparative example 610 has an undesirable step change to a higher sheet resistance so is not easily configured to heat a zone. Coefficient of determination R squared is 0.86 for the examples 620-680. R squared including the comparative example would be less than 0.82.

The comparative example is not optimally cured so defines a threshold of Sdr that is undesirable to obtain a desired sheet resistance. This teaching is unknown in the prior art.

The inventors believe that the threshold of Sdr represents a change in porosity of the printed substrate. The inventors have found that a gloss measurement is also indicative of porosity but that Sdr is more reliable regarding the effect of porosity on sheet resistance.

Sdr is measured by an AFM having tip radius 2-20 nm for fine structure in the order of 100 angstroms. By contrast, conventional Ra is measured by a profilometer having stylus radius 2 μm for coarse structure in the order of 10,000 angstroms.

Surprisingly other ink compositions selected to have less than the same threshold of Sdr also have correlation of Sdr and sheet resistance. So, the invention is enabled independent of ink composition.

A method for producing a glazing according to the invention selects firing time and firing temperature so that Sdr is less than the threshold. The method according to the invention is enabled without undue burden of experimentation by using porosity tests and gloss measurements for fast feedback. Glazings having promising combinations of firing time and firing temperature are confirmed as having less than the threshold of Sdr using an AFM.

Definitions

The Sa parameter is the Area Roughness and is expressed in nm as the arithmetical mean height of an area. It is an extension of Ra, the arithmetical mean height of a line.

The Sdr parameter is the Developed Interfacial Area Ratio and is expressed as the percentage of the definition area's additional surface area contributed by the roughness as compared to the planar definition area. Sdr of a completely smooth surface is 0.

The Sdq parameter is the Root Mean Square Gradient and is calculated as a root mean square of slopes at all points in the definition area. Sdq of a completely smooth surface is 0.

| Reference Numerals | |
|---|---|
| 1 | Glazing |
| 2 | Glass sheet |
| 3 | Printed layer |
| 4 | First busbar |
| 5 | Second busbar |
| 6 | Conductive coating |
| 7 | Coated print portion |
| 8 | Coated glass portion |
| 9 | Additional busbar |
| V | Voltage |

The invention claimed is:

1. A glazing comprising:
   a first glass sheet comprising a printed layer on a portion of a surface of the glass sheet,
   a conductive coating on the surface of the first glass sheet, the conductive coating extending over at least a portion of the printed layer to form a coated print portion and extending over a portion of the surface of the glass sheet to form a coated glass portion,
   wherein the coated print portion has a Developed Interfacial Area Ratio Sdr less than 27.45%, wherein Sdr is measured by an Atomic Force Microscope having tip radius between 2 and 20 nm and wherein the Sdr parameter is the Developed Interfacial Area Ratio and is expressed as the percentage of the definition area's additional surface area contributed by the roughness as compared to the planar definition area.

2. A glazing as claimed in claim 1, comprising at least two printed busbars for supplying electrical power to the conductive coating, the printed busbars each being in electrical contact with the conductive coating.

3. A glazing as claimed in claim 1, wherein the surface of the printed layer has an Average Roughness Ra greater than 0.5 μm.

4. A glazing as claimed in claim 1, wherein the surface of the printed layer has a Developed Interfacial Area Ratio Sdr in the range 5 to 25%.

5. A glazing as claimed in claim 1, wherein the sheet resistance of the coated glass portion is less than the sheet resistance of the coated print portion.

6. A glazing as claimed in claim 1, wherein the sheet resistance of the coated print portion is at least 20% greater than or less than the sheet resistance of the coated glass portion.

7. A glazing as claimed in claim 1, wherein the printed layer is an obscuration band.

8. A glazing as claimed in claim 1, wherein the printed layer is formed of an enamel ink comprising inorganic pigment and frit.

9. A glazing as claimed in claim 8, wherein the enamel ink comprises pigment having particles with an average particle size greater than 5.2 μm.

10. A glazing as claimed in claim 1, wherein the conductive coating comprises at least one infrared reflective layer.

11. A glazing as claimed in claim 10, wherein the conductive coating comprises a plurality of dielectric layers, each infrared reflective layer being located between at least two dielectric layers.

12. A glazing as claimed in claim 1, wherein the busbars are in contact with the coated print portion or further comprising an additional busbar for heating the coated glass.

13. A glazing as claimed in claim 1, wherein the printed busbars with the coated print portion are configured so the coated print portion heats a desired zone of the glass sheet.

14. A glazing as claimed in claim 1, wherein the printed layer has a portion that is patterned.

15. A glazing as claimed in claim 1, wherein the printed layer further comprises an overprint layer comprising a conductive print, to adjust the sheet resistance of the coated print portion.

16. A glazing according to claim 1, wherein the glazing comprises a wiper rest area or a camera area, and the coated print portion is located and adapted to heat the wiper rest area or the camera area.

17. A glazing as claimed in claim 1, further comprising a ply of interlayer material positioned on the glass sheet and a second glass sheet positioned on the ply of interlayer material to form a laminated glazing.

18. A vehicle window comprising a glazing as claimed in claim 1.

19. A method for producing a glazing, the method comprising:
   providing a first glass sheet
   providing an ink and printing a printed layer on a portion of a surface of the glass sheet,
   firing the ink of the printed layer for a firing time in the range 80 to 180 seconds and at a temperature in the range 500° C. to 695° C.,
   depositing a conductive coating on the surface of the first glass sheet, the conductive coating extending over at least a portion of the printed layer to form a coated print portion and extending over a portion of the surface of the glass sheet to form a coated glass portion,
   wherein the ink, the firing time and the firing temperature are selected so that the coated print portion has a Developed Interfacial Area Ratio Sdr less than 27.45%, wherein Sdr is measured by an Atomic Force Microscope having tip radius between 2 and 20 nm and wherein the Sdr parameter is the Developed Interfacial Area Ratio and is expressed as the percentage of the definition area's additional surface area contributed by the roughness as compared to the planar definition area.

20. A method for producing a glazing as claimed in claim 19, wherein the firing of the ink of the printed layer is at a firing temperature in the range 500 to 680° C.

21. A method for producing a glazing as claimed in claim 19, further comprising printing two busbars for supplying electrical power to the conductive coating, the two busbars each being in electrical contact with the conductive coating.

22. Use of a glazing as claimed in claim 1 in a vehicle, in a building, in an electronic display or in white goods.

* * * * *